United States Patent
Hayashi et al.

(10) Patent No.: US 7,743,901 B2
(45) Date of Patent: Jun. 29, 2010

(54) PARKING LOCK RELEASING APPARATUS

(75) Inventors: Tetsuya Hayashi, Saitama (JP); Naoki Osawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 538 days.

(21) Appl. No.: 11/704,213

(22) Filed: Feb. 9, 2007

(65) Prior Publication Data

US 2007/0209903 A1 Sep. 13, 2007

(30) Foreign Application Priority Data

Mar. 10, 2006 (JP) .......................... P.2006-065185

(51) Int. Cl.
*B60W 10/10* (2006.01)
*B60W 10/18* (2006.01)

(52) U.S. Cl. ................. 192/219.6; 192/220.7

(58) Field of Classification Search ............. 192/220.6, 192/220.7, 220, 219.6
See application file for complete search history.

(56) References Cited

U.S. PATENT DOCUMENTS

| 4,138,905 | A | * | 2/1979 | Konishi | .................... 74/577 R |
| 4,473,141 | A | * | 9/1984 | Mochida | ...................... 477/94 |
| 4,526,057 | A | * | 7/1985 | Mochida et al. | ............ 74/502.2 |
| 5,167,308 | A | * | 12/1992 | Osborn | ........................ 477/96 |
| 5,588,330 | A | * | 12/1996 | Kataumi et al. | ........... 74/483 R |
| 5,704,457 | A | * | 1/1998 | Kimura et al. | ........... 192/220.2 |
| 6,631,654 | B2 | * | 10/2003 | Ehrmaier et al. | ......... 74/473.15 |
| 6,699,155 | B2 | * | 3/2004 | Nagasaka | ..................... 477/94 |
| 6,779,645 | B2 | * | 8/2004 | Nagasaka et al. | ........ 192/219.6 |

FOREIGN PATENT DOCUMENTS

| JP | 5-288266 A | 11/1993 |
| JP | 2003-130210 A | 5/2003 |

* cited by examiner

*Primary Examiner*—Rodney H Bonck
*Assistant Examiner*—Justin Holmes
(74) *Attorney, Agent, or Firm*—Arent Fox LLP (57) ABSTRACT

A parking lock releasing apparatus includes a manipulator element operable to select a parking range of an automatic transmission, a sensor operable to detect a selection by the manipulator element, an actuator operable to operate a parking lock mechanism of the automatic transmission based on a detection by the sensor, and a manual lever operable to manually release an operation of the parking lock mechanism. The manual lever is operable on condition that a parking brake device is in operation.

4 Claims, 8 Drawing Sheets

PARKING LOCK RELEASING APPARATUS

The present invention claims priority from Japanese patent application no. 2006-065185 filed on Mar. 10, 2006, the entire content of which is incorporated herein by reference.

BACKGROUND OF INVENTION

1. Field of the Invention

The present invention relates to a parking lock releasing apparatus which includes a manipulator element operable to select a parking range of an automatic transmission, a sensor operable to detect a selection by the manipulator element, an actuator operable to operate a parking lock mechanism of the automatic transmission based on a detection by the sensor, and a manual lever operable to manually release a locking operation of the parking lock mechanism.

2. Description of the Related Art

Generally, a parking lock mechanism of an automatic transmission operates automatically when a shift lever is shifted to a "P" position, and automatically released from the operating state when the shift lever is shifted to any other positions than the "P" position. However, when the automatic release of the parking lock mechanism becomes disabled due to a failure of the power supply or the like, a vehicle cannot be towed to be moved. In order to cope with such a case, JP-A-5-288266 discloses a technique in which an operation of a parking lock mechanism can be manually released by operating a manual lever that is provided separately from the shift lever.

However, when the operation of the parking lock mechanism of the automatic transmission is manually released by operating the manual lever so as to tow a vehicle, in a case where the vehicle parked on a slope, there is a possibility that the vehicle may move by a gravity at the moment of manually releasing the operation of the parking lock mechanism, thereby bringing discomfort to a driver.

SUMMARY OF INVENTION

It is an object of the present invention to prevent a vehicle on a slop from moving when an operation of a parking lock mechanism of an automatic transmission is manually released in case where there is a failure in a shift-by-wire system.

According to one or more embodiments of the invention, a parking lock releasing apparatus includes: a manipulator element operable to select a parking range of an automatic transmission; a sensor operable to detect a selection by the manipulator element; an actuator operable to operate a parking lock mechanism of the automatic transmission based on a detection by the sensor; and a manual lever operable to manually release an operation of the parking lock mechanism. The manual lever is operable on condition that a parking brake device is in operation.

According to one or more embodiments of the invention, the parking lock releasing apparatus may further include: a lid operable to cover the manual lever; a locking device operable to lock the lid in a closed position; and a primary linkage portion operable to release an operation of the locking device interlockingly with an operation of the parking brake device.

According to one or more embodiments of the invention, the parking lock releasing apparatus may further include: a towing hook adapted to be coupled to a rope for towing a vehicle; and a secondary linkage portion operable to release the operation of the locking device when the rope is coupled to the towing hook.

According to one or more embodiments of the invention, a parking lock releasing apparatus includes: a manipulator element operable to select a parking range of an automatic transmission; a sensor operable to detect a selection by the manipulator element; an actuator operable to operate a parking lock mechanism of the automatic transmission based on a detection by the sensor; a manual lever operable to manually release an operation of the parking lock mechanism; and a towing hook adapted to be coupled to a rope for towing a vehicle. The manual lever is operable on condition that the rope is coupled to the towing hook.

According to one or more embodiments of the invention, the parking lock releasing apparatus may further include: a lid operable to cover the manual lever; a locking device operable to lock the lid in a closed position; and a secondary linkage portion operable to release an operation of the locking device when the rope is coupled to the towing hook.

According to one or more embodiments of the invention, the manipulator element may be a shift lever, the sensor may be a shift range sensor, the actuator may be a parking lock actuator, and the linkage portions may be bowden cables.

DETAILED DESCRIPTION

Hereinafter, an embodiment of the invention will be described with reference to the drawings.

A vehicle according to one embodiment includes a shift-by-wire system in which a shift lever is not mechanically connected to an automatic transmission, and shifting a gear in the automatic transmission is implemented by electric signals that are output in response to operations of the shift lever.

Figure 1:
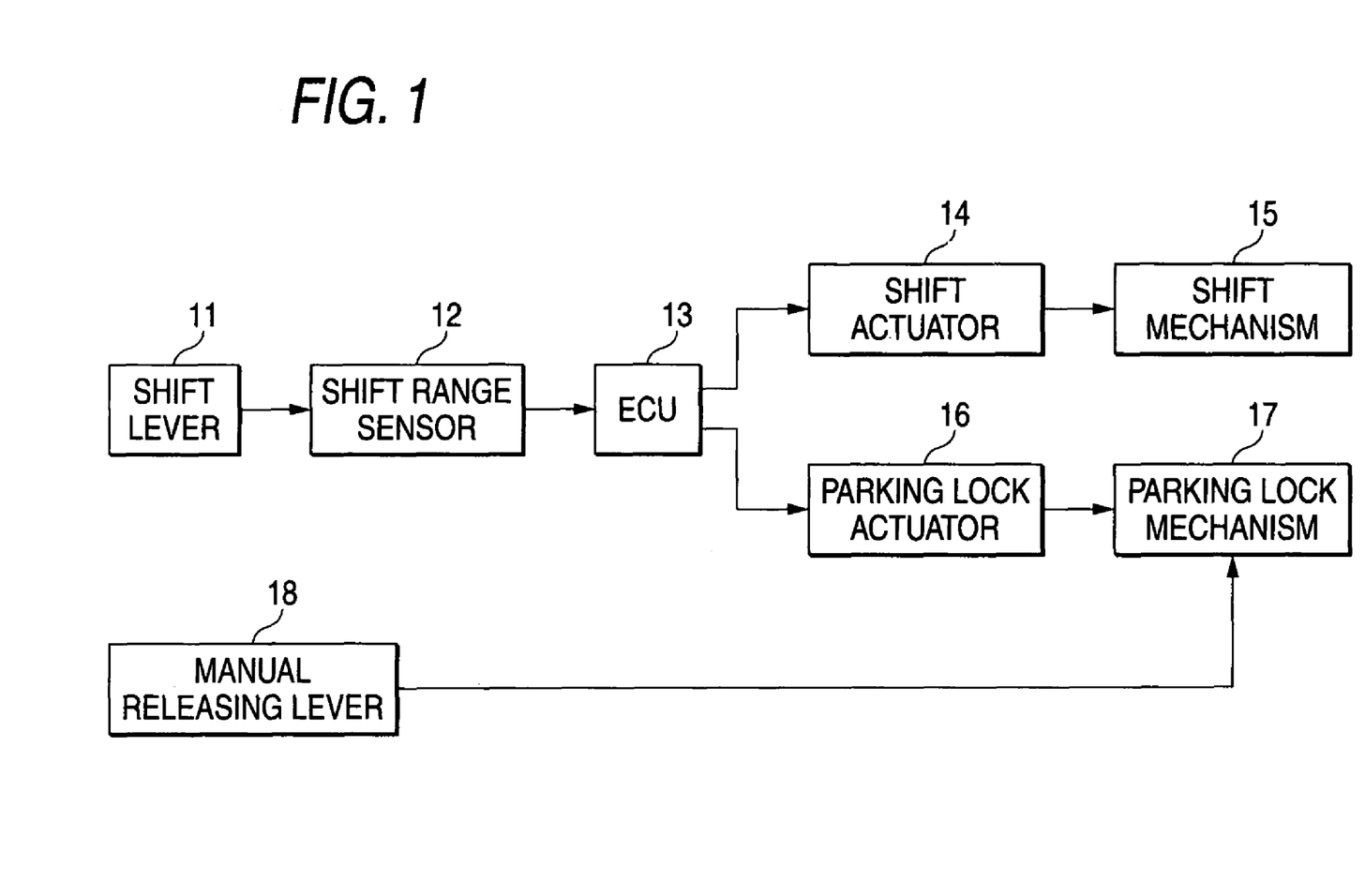
FIG. 1 is a block diagram showing a configuration of a shift-by-wire system.

As is shown in FIG. 1, the shift-by-wire system includes a shift lever 11, a shift range sensor 12 operable to detect a gear range designated by an operation of the shift lever 11, an electronic control unit 13 to which the gear range detected by the shift range sensor 12 is input, a shift actuator 14 which is actuated based on a command from the electronic control unit 13, and a shift mechanism 15 which is actuated by the shift actuator 14 and operable to shift a gear in the automatic transmission. The shift-by-wire system further includes a parking lock actuator 16 which is actuated when a range "P" is commanded from the electronic control unit 13, and a parking lock mechanism 17 which is actuated by the parking lock actuator 16 and operable to lock up the automatic transmission.

When the operation of the shift-by-wire system is disabled due to a failure such as a failure of a power supply while the shift lever 11 is in the range "P" and the parking lock mechanism 17 is actuated by the parking lock actuator 16, the operation of the parking lock mechanism 17 cannot be released since the parking lock actuator 16 is not actuated even if the shift lever 11 is shifted from the range "P" to a range "N". In such a case, the vehicle cannot be towed and moved. Also, in such a case, the shift lever 11 cannot be shifted to the range "P" either. In such cases, the operation of the parking lock mechanism 17 is released by operating a manual lever 18, so that the vehicle can be towed.

Figure 2:
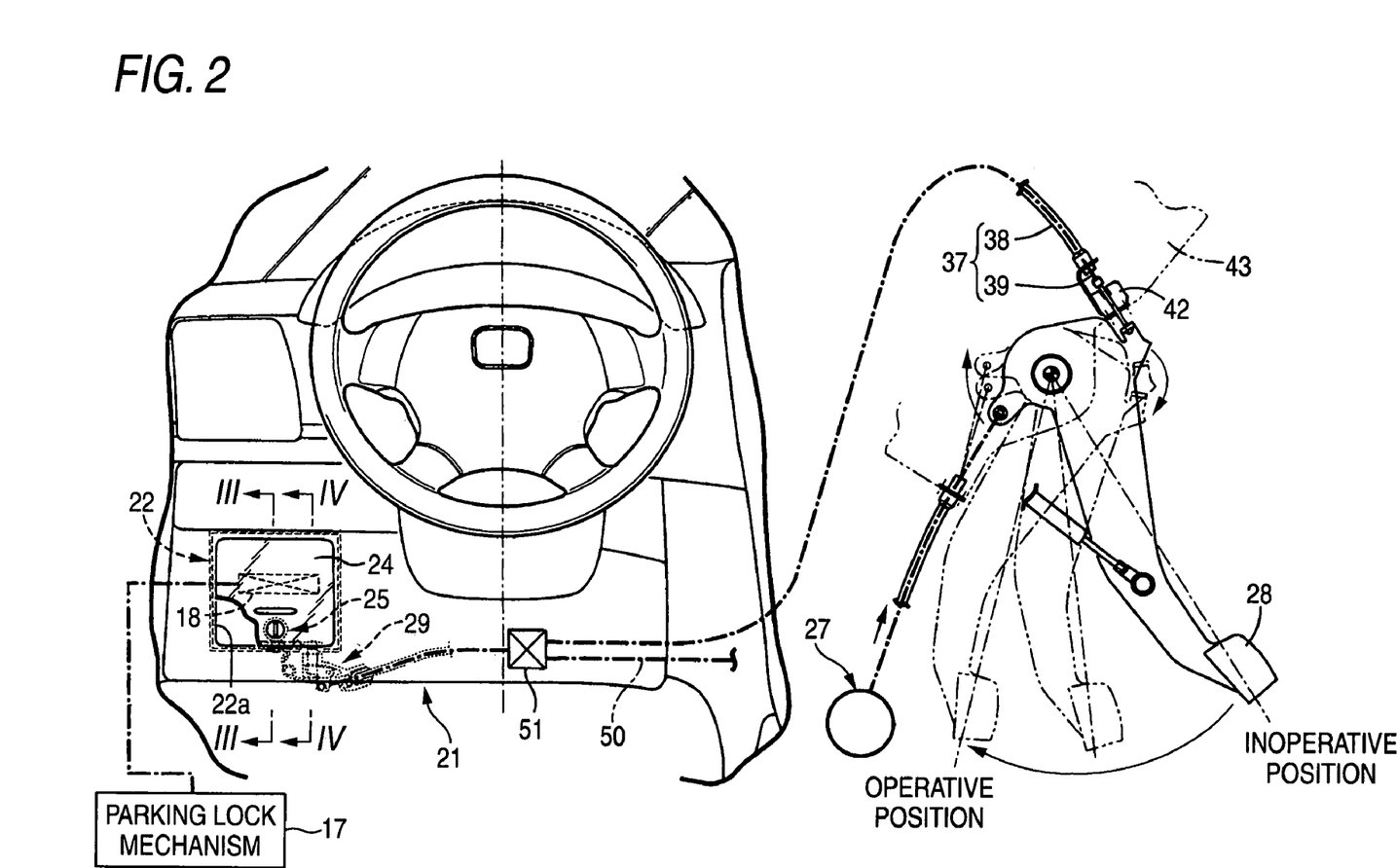
FIG. 2 is a diagram showing a mechanism releasing a parking lock via a parking brake.
Figure 3:
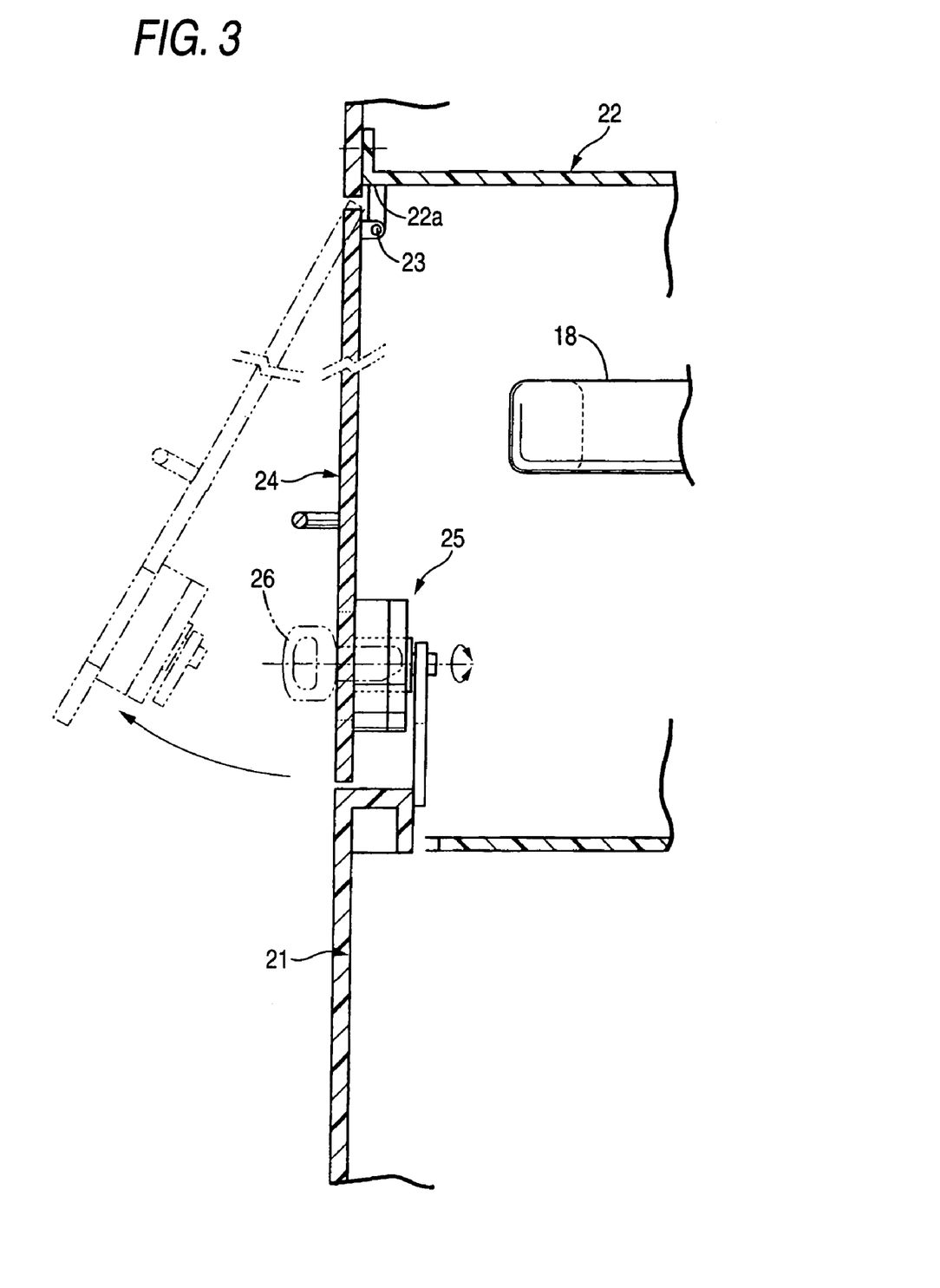
FIG. 3 is a sectional view taken along a line 3-3 in FIG. 2.
Figure 4:
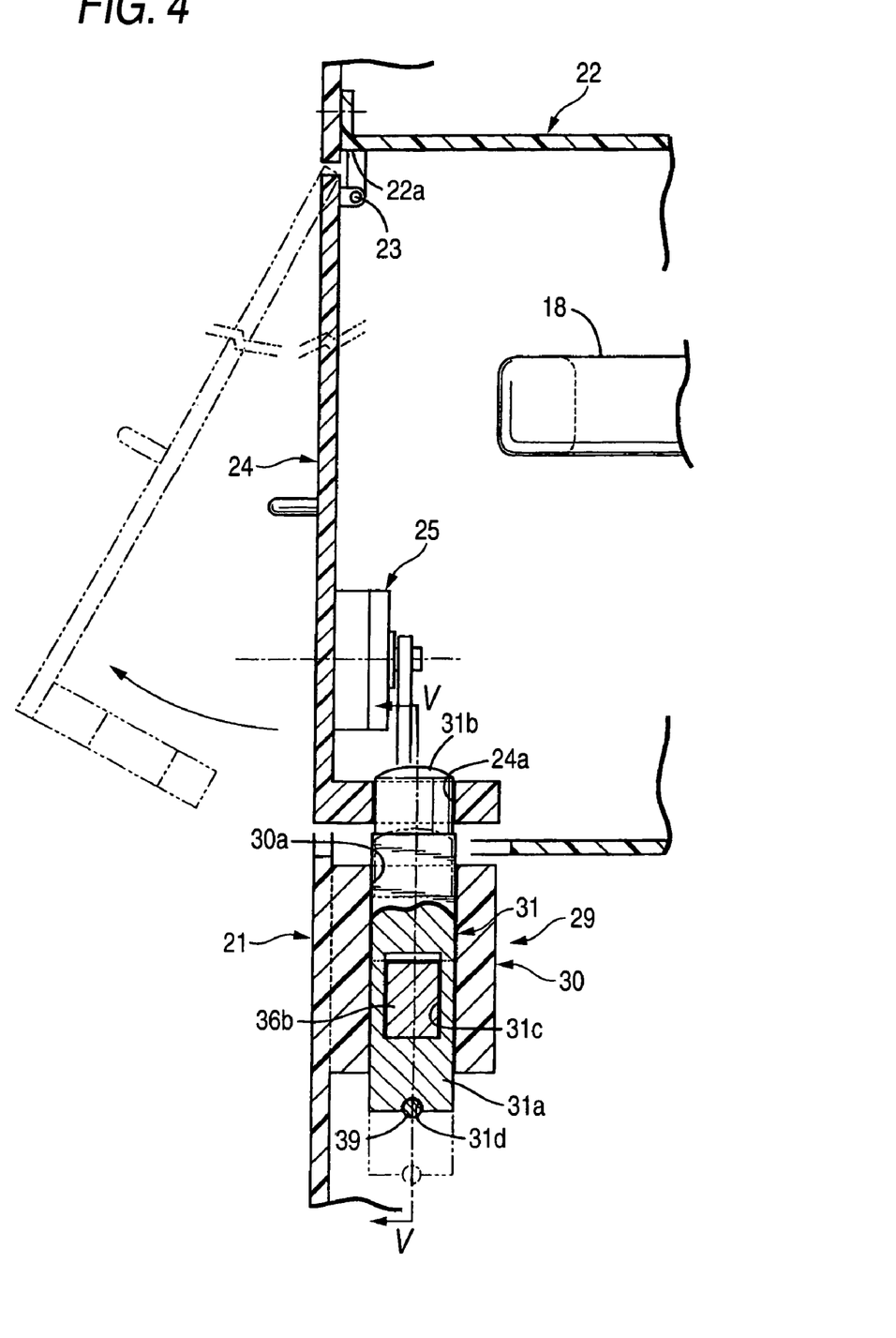
FIG. 4 is a sectional view taken along the a 4-4 in FIG. 2.

As is shown in FIGS. 2 and 3, the manual lever 18 is housed within a manual lever housing box 22 provided in a dashboard 21. An opening 22a of the manual lever housing box 22 can be opened or closed with a lid 24 which is rotatably supported by a hinge 23 at an upper end thereof. A key lock device 25 is provided at a lower portion of the lid 24, and an unlocking operation can be implemented by inserting a key 26 into the key lock device 25. In addition to the key lock device 25, a lower end of the lid 24 is adapted to be locked or unlocked by a locking device 29 which is adapted to interlock with an operation of a parking brake pedal 28 that is operable to operate a parking brake device 27.

When the parking brake pedal 28 having a well known structure is depressed by the driver in order to operate the parking brake device 27, the brake pedal 28 is locked in the depressed position, while the pedal 28 is released from a locked state and returns to its original position when a release lever (not shown) is operated.

Next, based on FIGS. 4 to 7, the construction of the locking device 29 will be described.

The locking device 29 includes a support wall 30 which is provided integrally on a back side of the dashboard 21 below the manual lever housing box 22 in such a manner as to project therefrom. A quadrangular prism-shaped guide portion 31a of a lock pin 31 is vertically slidably fitted in a engagement pin support hole 30a formed in the support wall 30. A circular prism-shaped engagement projection 31b is provided integrally at an upper end of the guide portion 31a of the lock pin 31 in such a manner as to project therefrom, and a lever engagement hole 31c is formed in the guide portion 31a in such a manner as to penetrate therethrough in a horizontal direction.

A torsion spring support pin 32 is provided on the back side of the dashboard 21 in such a manner as to project therefrom, and a central portion of a torsion spring 33 is supported by the torsion spring support pin 32. One end of the torsion spring 33 engages with an engagement groove 31d formed on a lower surface of the guide portion 31a of the lock pin 31. The other end of the torsion spring 33 engages with a engagement pin 34 that is provided on the back side of the dashboard 21 in such a manner as to project therefrom. Consequently, the lock pin 31 is biased upwards by a spring force of the torsion spring 33, and the engagement projection 31b thereof engages with an engagement hole 24a of the lid 24.

A lever 36 is rotatably supported by the support wall 30 via a fulcrum pin 35 which penetrates through a pin hole 30b formed on the support wall 20 and a pin hole 36a formed at an intermediate portion the lever 36. A primary arm 36b of the lever 36 engages with a lever engagement hole 31c of the lock pin 31, while a cable coupling hole 36d is formed on a secondary arm 36c.

A primary bowden cable 37 includes an outer tube 38 and an inner cable 39 which is slidably housed inside the outer tube 38, and connects the parking brake pedal 28 and the locking device 29. One end of the outer tube 38 is fixed to a cable support portion 30c of the support wall 30 via a connecting member 40, and one end of the inner cable 39 is fixed to the cable coupling hole 36d of the secondary arm 36c of the lever 36 via a connecting pin 41. The other end of the outer tube 38 is fixed to a vehicle body 43 via a bracket 42, and the other end of the inner cable 39 is fixed to the parking brake pedal 28.

Figure 8:
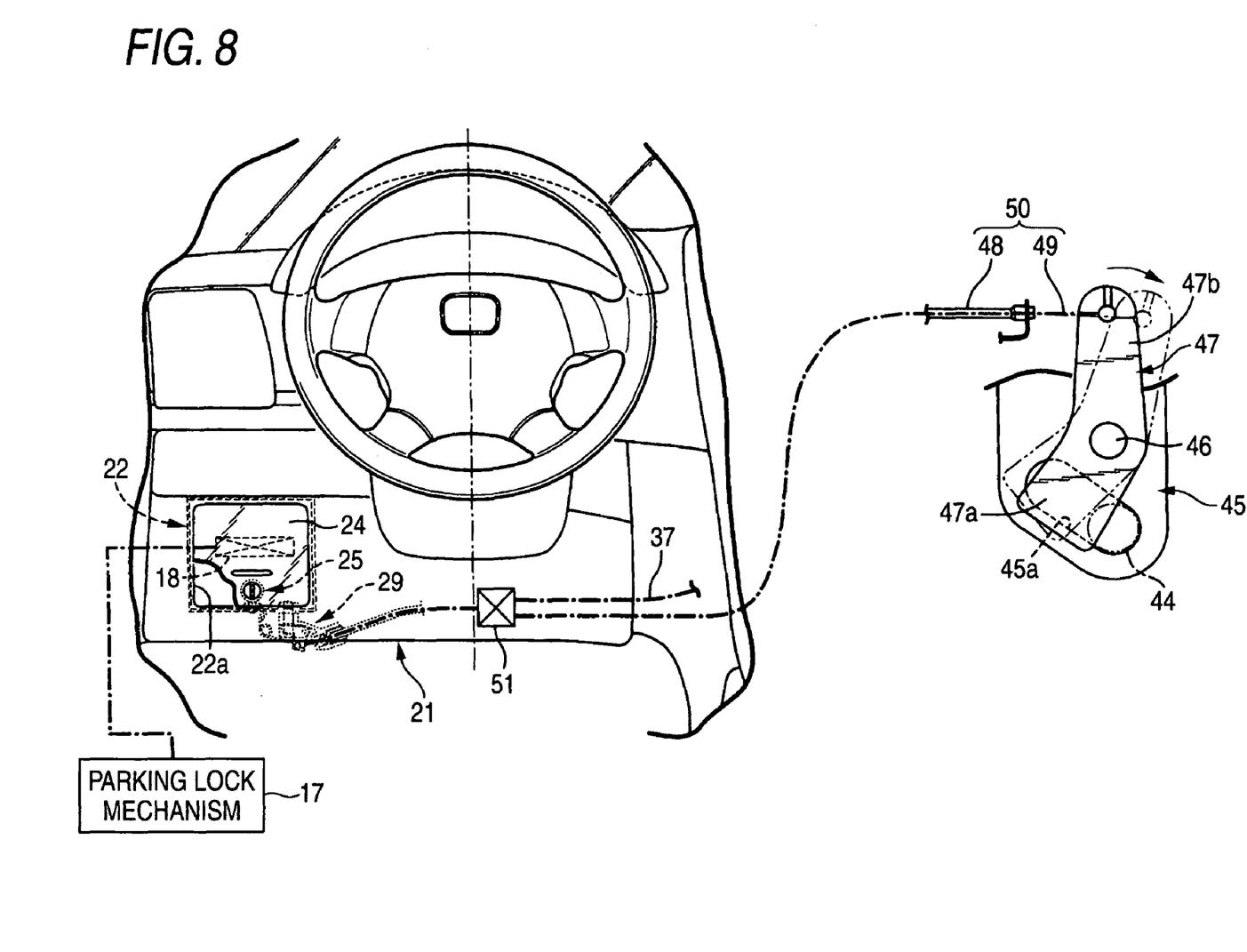
FIG. 8 is a diagram showing a mechanism of releasing the parking lock via a towing hook.

As is shown in FIG. 8, a towing hook 45 is provided on a lower surface of the vehicle body for use in towing the vehicle with a rope 44. The towing hook 45 is formed with a rope hole 45a to which the rope is coupled, and an intermediate portion of a lever 47 is rotatably supported on the towing hook 45 via a fulcrum pin 46. A primary arm 47a of the lever 47 is disposed in a position where a part of the rope hole 45a of the towing hook 45 can be covered, and one end of an inner cable 49 of a secondary bowden cable 50 including an outer tube 48 and the inner cable 49 is fixed to a secondary arm 47b of the lever 47. The other end of the secondary bowden cable 50 is connected to the primary bowden cable 37 via a lost motion mechanism 51. The lost motion mechanism 51 is operable to release the operation of the locking device 29 when either the inner cable 39 of the primary bowden cable 37 or the inner cable 49 of the secondary bowden cable 50 is pulled, without affecting the other cable that is not pulled.

Next, effects according to the embodiment of the invention will be described.

In the event that the operation of the shift-by-wire system is disabled while the parking lock mechanism 17 of the automatic transmission in operation, the operation of the parking lock mechanism 17 needs to be released in order to tow the vehicle. In such a case, the driver unlocks the key lock device 25 with the key 26 to open the lid 24 of the dashboard 21, and pulls the manual lever 18 inside the manual lever housing box 22 so as to release the operation of the parking lock mechanism 17. However, when the operation of the parking lock mechanism 17 is released in a state in which the vehicle is stopped on a slope and the parking brake device 27 provided to a wheel is not in operation, there is a possibility that the vehicle may move by the gravity.

According to the embodiment the invention, however, the manual lever can be operated on condition that the parking brake device 27 is in operation. Therefore, the operation of the manual lever can be reliably prevented while the parking brake device 27 is not in operation.

More specifically, the locking device 29 is provided on the lid 24 in addition to the key lock device 25, so that when the parking brake pedal 28 is in an inoperative state (when the parking brake device 27 is not in operation), the lid 24 is locked so as not to be opened due to an engagement of the engagement projection 31b of the lock pin 31 with the engagement hole 24a of the lid 24, whereby the manual lever 18 is prevented from being pulled.

Figure 5:
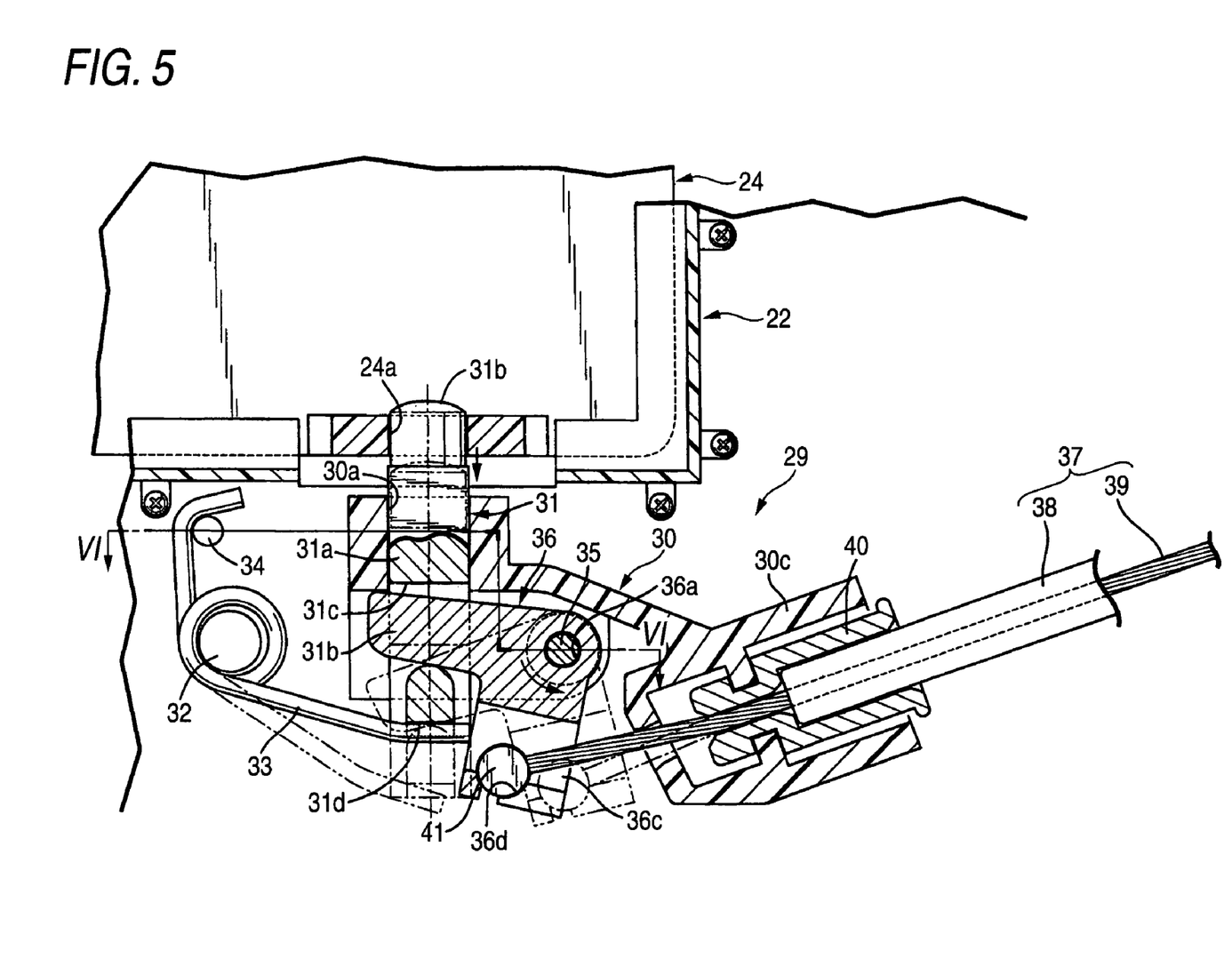
FIG. 5 is a sectional view taken along a line 5-5 in FIG. 4.
Figure 6:
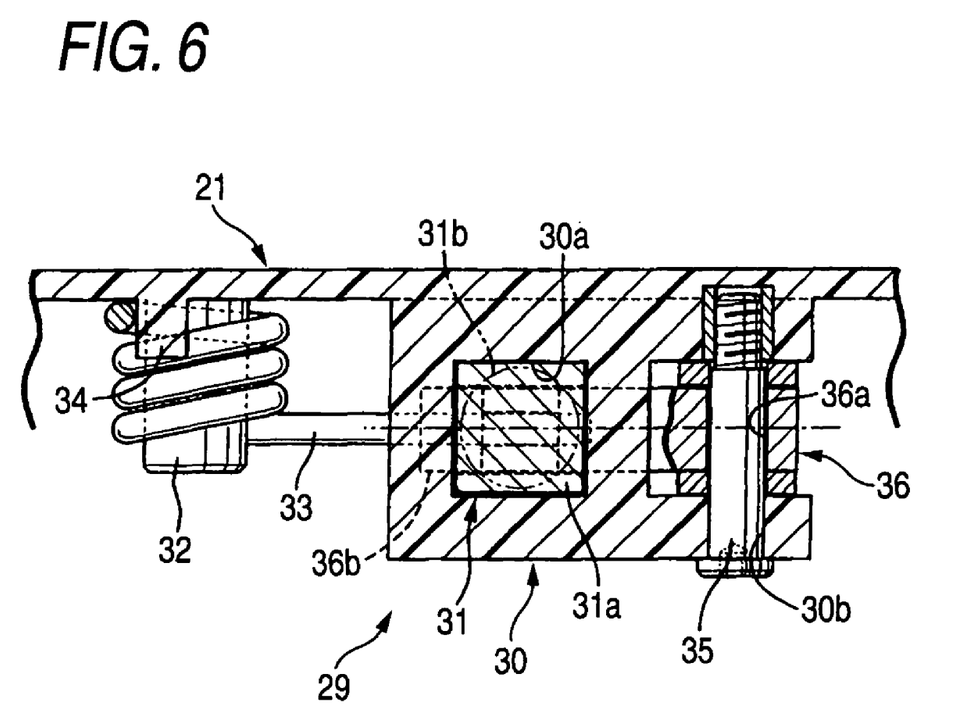
FIG. 6 is a sectional view taken along a line 6-6 in FIG. 5.
Figure 7:
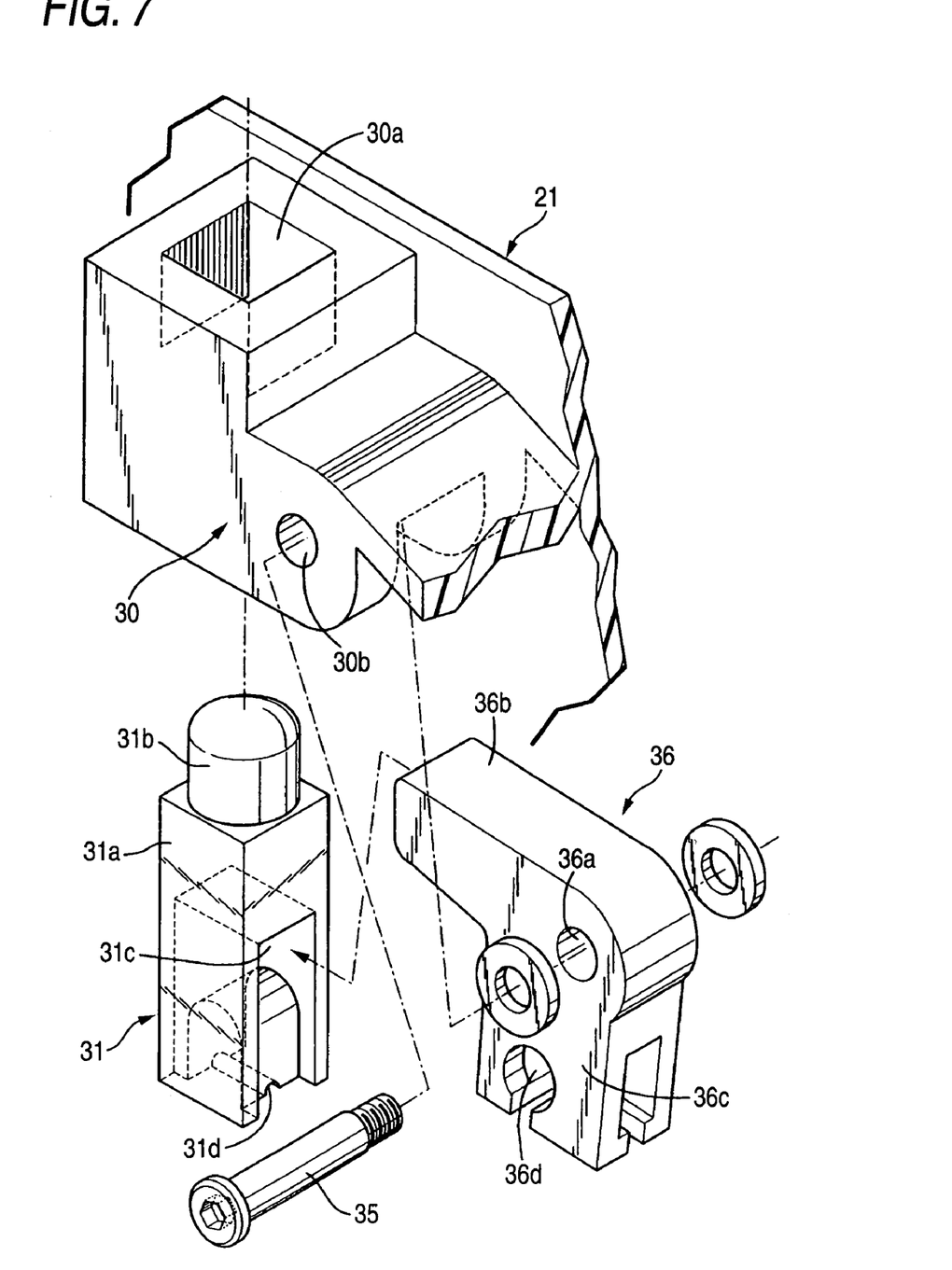
FIG. 7 is an exploded perspective view including a support wall, a engagement pin, and a lever.

When the parking brake device 27 is put into operation by the parking brake pedal 28 being depressed by the driver, the secondary arm 36c of the lever 36 of the locking device 29 is pulled via the primary bowden cable 37 (a primary linkage portion) connected to the brake pedal 28, whereby the lever 36 rotates about the fulcrum pin 35 in a counterclockwise direction as viewed in FIG. 5. In this way, the lever engagement hole 31c in the lock pin 31 is pushed downwards by the primary arm 36b, whereby the lock pin 31 is moved down, and the engagement projection 31b is disengaged from the engagement hole 24a of the lid 24.

As a result, the lid 24 can be opened by unlocking the key lock device 25 with the key 26, and then the manual lever 18 can be pulled to release the operation of the parking lock mechanism 17 of the automatic transmission so as to tow the vehicle. In this case, since the parking brake device 27 is in operation, there is no risk that the vehicle moves by releasing the operation of the parking lock mechanism 17.

In addition, even in case where the operation of the shift-by-wire system is disabled so that a gear shift to the range "P" cannot be implemented, the gear change to the range "P" can be implemented by the manual lever 18.

In the event that the vehicle is towed due to the operation of the shift-by-wire system being disabled while the parking lock mechanism 17 of the automatic transmission is in operation, the lever 47 necessarily rotates about the fulcrum pin 46 in a clockwise direction as viewed in FIG. 8 when the towing rope 44 engages with the rope hole 45a of the towing hook 45, whereby the lever 36 of the locking device 29 rotates about the fulcrum pin 35 via the secondary bowden cable 50 in the counterclockwise direction as viewed in FIG. 5, and this allows the engagement projection 31b of the lock pin 31 to be disengaged from the engagement hole 24a of the lid 24, thereby making it possible to release the lid 24.

Consequently, when towing the vehicle, the lid 24 can also be released and the manual lever 18 can be pulled without operating the parking brake device 27, thereby enhancing convenience.

Although the primary and secondary bowden cables 37, 50 are illustrated as the primary and secondary linkage portions in the above-described embodiment, a linkage portion may have an arbitrary construction, such as a link or a rod.

In addition, the manipulator element is not limited to the shift lever 11. The manipulator element may be a switch (or a button) that is operated manually and operable to select or cancel only with respect to the range "P".

While description has been made in connection with an embodiment of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A parking lock releasing apparatus comprising:
   a manipulator element operable to select a parking range of an automatic transmission;
   a sensor operable to detect a selection by the manipulator element;
   an actuator operable to operate a parking lock mechanism of the automatic transmission based on a detection by the sensor;
   a manual lever operable to manually release an operation of the parking lock mechanism, wherein the manual lever is distinct from the manipulator element;
   a locking device which allows an operation of the manual lever on condition that a parking brake device is in operation;
   a lid operable to cover the manual lever, wherein the locking device is operable to lock the lid in a closed position; and
   a primary linkage portion operable to release an operation of the locking device interlockingly with an operation of the parking brake device.

2. The parking lock releasing apparatus according to claim 1, further comprising:
   a towing hook adapted to be coupled to a rope for towing a vehicle; and
   a secondary linkage portion operable to release the operation of the locking device when the rope is coupled to the towing hook.

3. A parking lock releasing apparatus comprising:
   a manipulator element operable to select a parking range of an automatic transmission;
   a sensor operable to detect a selection by the manipulator element;
   an actuator operable to operate a parking lock mechanism of the automatic transmission based on a detection by the sensor;
   a manual lever operable to manually release an operation of the parking lock mechanism; and
   a towing hook adapted to be coupled to a rope for towing a vehicle,
   wherein the manual lever is operable on condition that the rope is coupled to the towing hook.

4. The parking lock releasing apparatus according to claim 3, further comprising:
   a lid operable to cover the manual lever;
   a locking device operable to lock the lid in a closed position; and
   a secondary linkage portion operable to release an operation of the locking device when the rope is coupled to the towing hook.

* * * * *